United States Patent [19]

d'Achon

[11] 4,350,015
[45] Sep. 21, 1982

[54] MACHINE FOR CONVERTING THERMAL ENERGY INTO WORK

[76] Inventor: Herve d'Achon, Domaine de Bagari, 83120 Ste Maxime S/Mer, France

[21] Appl. No.: 190,260

[22] Filed: Sep. 24, 1980

[30] Foreign Application Priority Data

Sep. 26, 1979 [FR] France ................. 79 23914

[51] Int. Cl.³ .................... F03G 7/00; F01K 9/00
[52] U.S. Cl. .................... 60/675; 60/190; 165/110
[58] Field of Search ............ 60/675, 690, 692, 531; 165/110

[56] References Cited

U.S. PATENT DOCUMENTS

| | | | |
|---|---|---|---|
| 3,841,097 | 10/1974 | Siegel | 60/517 |
| 4,135,366 | 1/1979 | Siegel | 60/497 |
| 4,187,686 | 2/1980 | Pommier | 60/675 X |

FOREIGN PATENT DOCUMENTS

| | | |
|---|---|---|
| 2220167 | 11/1973 | Fed. Rep. of Germany . |
| 2460153 | 10/1975 | Fed. Rep. of Germany . |
| 2364327 | 1/1974 | France . |
| 42651 | 7/1963 | Luxembourg . |
| 232682 | 4/1925 | United Kingdom . |

*Primary Examiner*—Allen M. Ostrager
*Attorney, Agent, or Firm*—Sandler & Greenblum

[57] ABSTRACT

A closed circuit machine for converting thermal energy into work has a heating fluid circulating therethrough which constitutes a source of heat. The machine includes a tank adapted to hold liquid and traversed by a first coil for circulating the heating fluid. The coil has two ends which are attached to a basin containing liquid. A condenser is positioned above the tank and serves to condense the fluid in the gaseous state, thereby and serving as a cold source capable of removing heat from the tank via a thermally insulated pipe. A hydraulic motor is positioned in the lower portion of a liquid return pipe system which connects the condenser and tank. A Venturi tube is positioned around the condenser, which is coated with a spongy material. The spongy material is continuously humidified, and the combination of the humidified spongy material and the air moving within the Venturi tube accelerates evaporation and therefore the amount of condensed liquid leaving the condenser. The potential energy of this liquid, in turn, is used to operate the motor.

8 Claims, 1 Drawing Figure

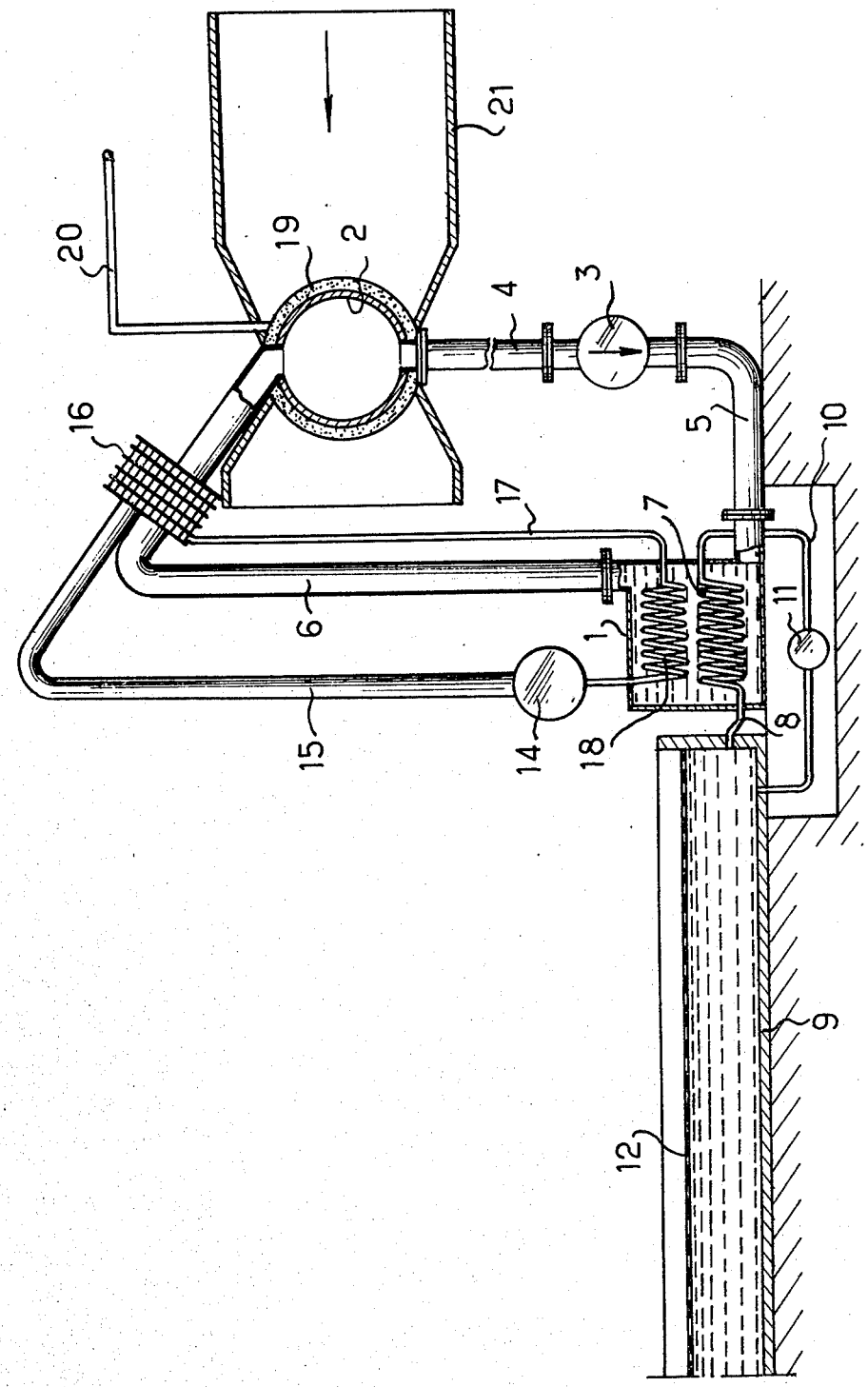

MACHINE FOR CONVERTING THERMAL ENERGY INTO WORK

BACKGROUND OF THE INVENTION

1. Field of the Invention

The present invention generally relates to a machine for converting thermal energy into work which operates as a closed circuit and more specifically to an efficient machine which enhances rapid steam condensation to increase the amount of energy converted to work by a motor.

2. Description of Prior Art

Conventional thermal machines include a liquid tank traversed by a coil in which a heating fluid circulates, thereby constituting a source of heat, a condenser situated at a higher level than the tank and thereby constituting a source of cold which is capable of removing heat via a thermally insulated pipe in which a low pressure is produced. The insulated pipe connects the tank to the condenser and a hydraulic motor is provided in the lower part of a return pipe system which connects the condenser to the tank. In this manner the heat generated in the tank under the low pressure prevailing above it rises as far as the condenser, where it condenses, and then descends in the form of a liquid, the potential energy of which serves to actuate the hydraulic motor, thereby converting thermal energy to work. The liquid leaves the motor and returns to the tank via a pipe. The coil is connected at both of its ends to a basin and the basin is partly filled with water, a pump being interposed along one of the connections between the liquid tank and the basin.

SUMMARY OF THE INVENTION

Accordingly, it is a general object of the present invention to provide a new and improved machine for converting thermal energy into work which runs more efficiently than previous thermal machines and which generates more heat by enhancing rapid condensation of gaseous fluid, e.g., steam.

A further object of the present invention is to provide a new and improved thermal machine which enables more rapid condensation to take place in a steam condenser.

The thermal machine to which the present invention relates is generally of the type defined above, its condenser being positioned in a Venturi tube and coated with a spongy material, means being provided for the permanent and continuous humidification of the spongy material. The condenser is thereby made more efficient and steam can be condensed more rapidly than in prior art devices.

To increase the condensation of steam even further, the machine can comprise a heat exchanger positioned close to the condenser, on the thermally insulated pipe connecting the tank to the condenser, the exchanger being connected into and forming part of an independent circuit which comprises a coil passing through the tank, a compressor serving to liquefy a fluid in the gaseous state coming from the exchanger, means for vaporizing the fluid liquefied in the tank and a pipe for returning the fluid in the gaseous state from the exchanger to the compressor.

Briefly, the above and other objects, features and advantages of the present invention are attained in one aspect thereof by providing a new and improved closed circuit machine for converting thermal energy into work and having a heating fluid circulating therethrough and thereby constituting a source of heat. The machine comprises a tank adapted to hold the liquid and traversed by a first coil for circulating the heating fluid, the first coil having two ends, both of which are connected to a basin. A condenser is positioned above the tank and comprises a cold source capable of removing heat from the tank via a thermally insulated pipe connecting the tank and the condenser and having a low pressure created therein. A hydraulic motor is positioned in the lower portion of a return pipe system connected to the condenser and tank. A pump is interposed between one of the coil ends and the basin, and the basin is adapted to be partially filled with water. A Venturi tube is positioned around the condenser and a spongy material is coated about the condenser, this material being permanently and continously humidified. When the system is filled with fluid, heat is generated in the tank under low pressure and rises to the condenser, where the gaseous fluid condenses and descends as a liquid to actuate the hydraulic motor. This converts the thermal energy in the closed system into energy for operating the motor, and therefore into work.

Upon study of the specification and appended claims, further objects, features and advantages of the present invention will become more fully apparent to those skilled in the art to which this invention pertains.

BRIEF DESCRIPTION OF THE DRAWINGS

The above and other objects, features and advantages of the present invention will now be described in greater detail by reference to one embodiment thereof, solely by way of example, as illustrated in attached drawing wherein:

The FIGURE is a schematic view of a machine for converting thermal energy into work which is formed in accordance with the present invention.

DETAILED DESCRIPTION OF THE DRAWINGS

Referring more specifically to the FIGURE, the machine shown comprises a liquid tank 1, condenser 2 situated higher than tank 1 and hydraulic motor 3. The motor is positioned at approximately the same level as tank 1.

The liquid can be water or other liquid, although steam is referred to hereinafter.

The tank, condenser and motor form part of a hermetically closed circuit which also includes first return pipe 4 connecting the condenser to the motor and second return pipe 5 which connects the motor to tank 1. Pipes 4 and 5 together form a return pipe system. The closed circuit also includes a thermally insulated pipe 6 which is connected to condenser 2.

Tank 1 is traversed by coil 7, the coil having its first end connected to basin 9 by first connecting pipe 8 and its other end connected to the basin by second connecting pipe 10. A pump 11 is interposed along pipe 10 between the basin and the tank.

Basin 9 may be closed or exposed to open air and is partially filled with heated water. The surface of the water is covered by a layer of oil 12 if the tank is open to the air; this serves to prevent calorie loss due to evaporation.

Condenser 2 is surrounded by a predetermined thickness of spongy material 19, which is permanently and continuously humidified by a suitable water supply via water supply pipe 20. The condenser is mounted within a Venturi tube 21 oriented in such a way as to enable the prevailing wind or air to act on it, as indicated by the arrow in the FIGURE. This action accelerates evaporation and condensation within the system and increases the liquid flowing through pipe 4 to operate the motor.

Condenser 2 removes heat derived from the steam which it receives as a result of evaporation which occurs through spongy material 10. This evaporation is accelerated by the circulation of air through the Venturi tube and about the condenser. Motor 3 operates under the weight of the column of liquid which is condensed and which it receives from condenser 2.

The machine is completed by an independent circuit which includes compressor 14, second coil 18 positioned within tank 1 and connected by third connecting pipe 17 to heat exchanger 16. The thermally insulated pipe 6 passes through the heat exchanger and the heat exchanger is connected to the intake of compressor 14 via fourth connecting pipe 15.

The operation of the machine is as follows:

Pump 11, via first connecting pipe 8 and first coil 7, causes relatively hot water to be taken from basin 9 by suction, the water then returning to the basin via pipe 10 and pump 11. The independent circuit comprising second coil 18, third connecting pipe 17, heat exchanger 16, fourth connecting pipe 15 and compressor 14 contains fluid in the gaseous state, the purpose of compressor 14 being to compress the fluid to such an extent that it liquefies in coil 18. The heat generated by this compression is then transferred to the liquid in tank 1 via coil 18.

The thus liquefied fluid passes through pipe 17, which is connected to the heat exchanger by a capillary orifice enabling a pressure to be maintained which corresponds to the liquid state of the fluid. The fluid in the liquid state vaporizes within heat exchanger 16, which cools that part of thermally insulated pipe 6 which is adjacent to condenser 2.

Pipe 6 is provided from the outset of the operation with a suitable vacuum which enables the liquid in tank 1 to vaporize under the effect of the quantity of heat which it receives from coils 7 and 18. The liquid rises in the form of steam in pipe 6, which is accomodated within heat exchanger 16, this condensation terminating within condenser 2, where it is accelerated by the evaporation of water contained in spongy material 19. The steam then descends in the form of liquid in pipe 4, thereby causing motor 3 to turn and the liquid to return to tank 1 via pipe 5. The motor is operated by the conversion of the thermal energy of the fluids in the system into the potential energy of liquid in pipe 4, which operates the motor. The increased condensation produced by the spongy material, water supply, Venturi tube and heat exchanger circuit increases the liquid present in pipe 4 and therefore also the energy present to operate the motor, providing a more energy efficient system.

From the foregoing description, one skilled in the art can easily see that the invention is not limited to the version above described and illustrated, and numerous modifications thereto can be made with respect to details thereof without departing from the scope of the invention.

What is claimed is:

1. A closed circuit machine for converting thermal energy into work and having a heating fluid circulating therethrough, said heating fluid comprising a source of heat, said machine comprising:
    (a) a tank adapted to hold liquid and traversed by a first coil for circulating said heating fluid, said coil having two ends, both of said ends being connected to a basin, said basin adapted to be partly filled with water;
    (b) a condenser positioned above said tank, said condenser comprising a cold source capable of evacuating heat from said tank via a thermally insulated pipe connecting said tank and said condenser and having a low prssure therein;
    (c) a hydraulic motor positioned in the lower portion of a return pipe system connected to said condenser and said tank;
    (d) a Venturi tube positioned about said condenser; and
    (e) a spongy material coated about said condenser and means for humidifying said spongy material, wherby when said closed circuit is filled with fluid, heat is generated within said tank and gaseous fluid rises under low pressure to said condenser, condenses into liquid therein and descends as liquid to actuate said hydraulic motor.

2. A machine in accordance with claim 1 wherein said return pipe system comprises a first return pipe connected to said condenser and said motor and a second return pipe connected to said motor and said tank.

3. A machine in accordance with claim 1 wherein said hydraulic motor is positioned at approximately the same level as said tank.

4. A machine in accordance with claim 1 further comprising an independent fluid circuit including a heat exchanger positioned close to said condenser and along said thermally insulated pipe connecting said tank to said condenser, a second coil traversing said tank, a compressor adapted to liquefy a fluid in the gaseous state coming from the exchanger, means for vaporizing fluid within the exchanger and a connecting pipe adapted to return the vaporized fluid in the gaseous state form the exchanger to the compressor.

5. A machine in accordance with claim 1 wherein said basin is closed.

6. A machine in accordance with claim 1 wherein said basin is open to the air and a layer of oil is positioned on the surface of liquid contained in the basin for retarding evaporation of said liquid.

7. A machine in accordance with claim 1 wherein said humidifying means comprises a water supply pipe.

8. A machine in accordance with claim 1 further comprising a pump interposed between one of the ends of said coil and said basin.

* * * * *

UNITED STATES PATENT AND TRADEMARK OFFICE
CERTIFICATE OF CORRECTION

PATENT NO. : 4,350,015
DATED : September 21, 1982
INVENTOR(S) : Herve d'Achon

It is certified that error appears in the above-identified patent and that said Letters Patent is hereby corrected as shown below:

In column 2, line 17, delete "continously" and insert --continuously--;

In column 3, line 44, delete "accomodated" and insert --accommodated--;

In column 3, line 60, delete "above described" and insert --above-described--;

In column 4, line 18, delete "prssure" and insert --pressure--;

In column 4, line 27, delete "wherby" and insert --whereby--.

Signed and Sealed this

Eleventh Day of January 1983

[SEAL]

Attest:

GERALD J MOSSINGHOFF

*Attesting Officer*   *Commissioner of Patents and Trademarks*